United States Patent
Khalil et al.

(10) Patent No.: US 10,897,217 B2
(45) Date of Patent: Jan. 19, 2021

(54) SWITCHED RELUCTANCE MOTOR CONTROL SYSTEM

(71) Applicant: Caterpillar Inc., Deerfield, IL (US)

(72) Inventors: Ahmed Khalil, Dunlap, IL (US); Sam Han, Dunlap, IL (US); James Thorne, Peoria, IL (US); Jesse Gerdes, Dunlap, IL (US); Jackson Wai, Dunlap, IL (US); Carlos Nino Baron, Edwards, IL (US); Sajan Abdul, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/107,623

(22) Filed: Aug. 21, 2018

(65) Prior Publication Data

US 2020/0067433 A1 Feb. 27, 2020

(51) Int. Cl.
*H02P 6/182* (2016.01)
*H02P 25/089* (2016.01)
*H02P 25/092* (2016.01)

(52) U.S. Cl.
CPC ............ *H02P 6/182* (2013.01); *H02P 25/089* (2016.02); *H02P 25/0925* (2016.02); *H02P 2203/01* (2013.01); *H02P 2203/03* (2013.01)

(58) Field of Classification Search
CPC ........ H02P 25/089; H02P 6/185; H02P 23/03; H02P 25/083; H02P 2203/01; H02P 2203/03; H02P 2203/11
See application file for complete search history.

(56) References Cited

U.S. PATENT DOCUMENTS

| | | | | |
|---|---|---|---|---|
| 4,772,392 A * | 9/1988 | Sanders, Jr. | ....... | B01D 67/0009 210/500.23 |
| 4,772,832 A * | 9/1988 | Okazaki | ............... | G05D 1/0261 318/587 |
| 4,772,839 A * | 9/1988 | MacMinn | ............... | H02P 6/185 318/685 |
| 5,051,680 A * | 9/1991 | Belanger | ................ | H02P 1/163 318/400.22 |
| 5,097,190 A * | 3/1992 | Lyons | ................... | H02P 25/089 318/400.01 |
| 5,525,887 A * | 6/1996 | Van Sistine | ............. | H02P 6/185 318/400.13 |

(Continued)

FOREIGN PATENT DOCUMENTS

| | | |
|---|---|---|
| CN | 105245139 B | 10/2017 |
| CN | 107395087 A | 11/2017 |
| CN | 104682787 B | 12/2017 |

OTHER PUBLICATIONS

Gregory Pasquesoone et al: "Position Estimation at Starting and Lower Speed in Three-Phase Switched Reluctance Machines Using Pulse Injection and Two Thresholds", IEEE Transactions on Industry Applications, IEEE Service Center, Piscataway, NJ, US, vol. 47, No. 4, Jul. 1, 2011, the whole document.

*Primary Examiner* — Rina I Duda
(74) *Attorney, Agent, or Firm* — Harrity & Harrity LLP (57) ABSTRACT

A device may receive a current measurement of a motor identifying a plurality of component currents associated with a plurality of phases. The device may determine a position estimate for the motor based on the plurality of component currents associated with the plurality of phases. The device may control the motor based on the plurality of component currents.

20 Claims, 4 Drawing Sheets

(56) References Cited

U.S. PATENT DOCUMENTS

| | | | | |
|---|---|---|---|---|
| 5,982,117 | A * | 11/1999 | Taylor | H02P 25/089 318/254.1 |
| 6,107,772 | A * | 8/2000 | Liu | H02P 25/089 318/701 |
| 7,202,618 | B2 * | 4/2007 | Ide | H02M 7/5387 318/400.12 |
| 7,279,863 | B2 * | 10/2007 | Ahn | H02P 6/185 318/254.1 |
| 8,593,098 | B2 * | 11/2013 | Paintz | H02P 6/185 318/599 |
| 8,810,188 | B2 | 8/2014 | Husain et al. | |
| 8,866,433 | B2 | 10/2014 | Gerdes et al. | |
| 9,941,831 | B1 | 4/2018 | Miller | |
| 2004/0108826 | A1 * | 6/2004 | Green | H02P 25/092 318/400.33 |
| 2005/0067998 | A1 * | 3/2005 | Green | H02P 6/185 318/701 |
| 2005/0099152 | A1 * | 5/2005 | Norman | H02P 6/18 318/801 |
| 2014/0035505 | A1 * | 2/2014 | Wai | H02P 23/03 318/461 |
| 2014/0117901 | A1 * | 5/2014 | Gerdes | H02P 25/083 318/400.33 |
| 2014/0232311 | A1 * | 8/2014 | Hill | H02P 6/185 318/400.33 |

\* cited by examiner

SWITCHED RELUCTANCE MOTOR CONTROL SYSTEM

TECHNICAL FIELD

The present disclosure relates generally to a control system and, more particularly, to a switched reluctance motor control system.

BACKGROUND

A machine may include a transmission coupled to a power source, such as an internal combustion engine or an electric motor to enable the machine to be repositioned and/or to travel between locations. With increased interest in energy conservation and avoidance of use of fossil fuels, use of electric motors is becoming more common. Electric motors may be used to convert electrical energy into mechanical power to drive the machine. For example, electric motors may be used in a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other equipment.

Alternatively, some machines may include both an electric motor and an internal combustion engine. For example, an electrical drive train of a machine, such as a tractor, may include an internal combustion engine, a generator coupled to the internal combustion engine, a direct current (DC) power source, and a motor. In this case, the internal combustion engine may be used to reposition the machine, and the generator, the DC power source, and the motor may be used to drive one or more implements of the machine. An inverter may be coupled to the DC power source and the motor to convert DC to AC power. The inverter may provide the AC power to the generator to electrically drive the motor and/or to electrically brake the motor.

The motor may be a switched reluctance (SR) motor, which may be controlled using open-loop table-based control based on phases provided by the inverter. To control phases of the inverter, a controller may determine a relative angular position of a rotor and/or a stator of the switched reluctance motor based on a signal received from a sensor package of the switched reluctance motor. The sensor package of the switched reluctance motor may include components, such as a set of position sensors, a speed wheel, a harness, a housing, and/or the like. These components may be expensive, excessively large, and/or prone to failure, damage, and/or the like.

One attempt to improve motor controllers is disclosed in U.S. Pat. No. 8,810,188 that was filed by Husain et al. on Nov. 9, 2009 ("the '188 patent"). In particular, the '188 patent discloses a method of position estimation for three-phase switched reluctance machines. The method, disclosed in the '188 patent, includes determining an amplitude of a maximum amperage of a pulse current for a first phase.

However, determining the maximum amperage may not satisfy a threshold degree of accuracy and/or enable position determination within a threshold period of time required for control of a switched reluctance motor. A switched reluctance motor control system of the present disclosure solves one or more problems set forth above and/or other problems in the art.

SUMMARY

According to some implementations, the present disclosure is related to a switched reluctance motor control system including a memory and one or more processors. The one or more processors may be configured to cause a current to be provided to the switched reluctance motor. The one or more processors may be configured to determine a plurality of component currents associated with a plurality of phases based on a result of causing the current to be provided to a switched reluctance motor. The one or more processors may be configured to determine that a first component current, of the plurality of component currents, is equal to a second component current of the plurality of component currents. The one or more processors may be configured to determine, based on whether a third component current, of the plurality of component currents, is greater than or less than the first component current and the second component current, an angular position estimate for the switched reluctance motor. The one or more processors may be configured to control, based on the angular position estimate, the switched reluctance motor.

According to some implementations, the present disclosure is related to a method. The method may include receiving, by a device, a current measurement of a motor identifying a plurality of component currents associated with a plurality of phases. The method may include determining, by the device, a position estimate for the motor based on the plurality of component currents associated with the plurality of phases. The method may include controlling, by the device, the motor based on the plurality of component currents.

According to some implementations, the present disclosure is related to a machine. The machine may include a motor including a stator and a rotor, an inverter coupled to the motor, and a controller. The controller may be configured to cause the inverter to provide a current associated with a priming voltage to the motor, wherein the current is associated with a plurality of phases to the motor, and wherein the current is modulated based on back electromotive force (EMF) associated with the motor. The controller may be configured to determine, based on causing the inverter to provide the current, a plurality of current components corresponding to the plurality of phases. The controller may be configured to determine, based on the plurality of current components, an initial position estimate for the stator or the rotor. The controller may be configured to control the inverter and the motor using at least one command signal based on the initial position estimate.

DETAILED DESCRIPTION

This disclosure relates to a switched reluctance motor control system. The switched reluctance motor control system has universal applicability to any machine utilizing such a switched reluctance motor control system. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, and/or the like. Moreover, one or more implements may be connected to the machine and controlled using an electric motor associated with the switched reluctance motor control system described herein.

Figure 1:
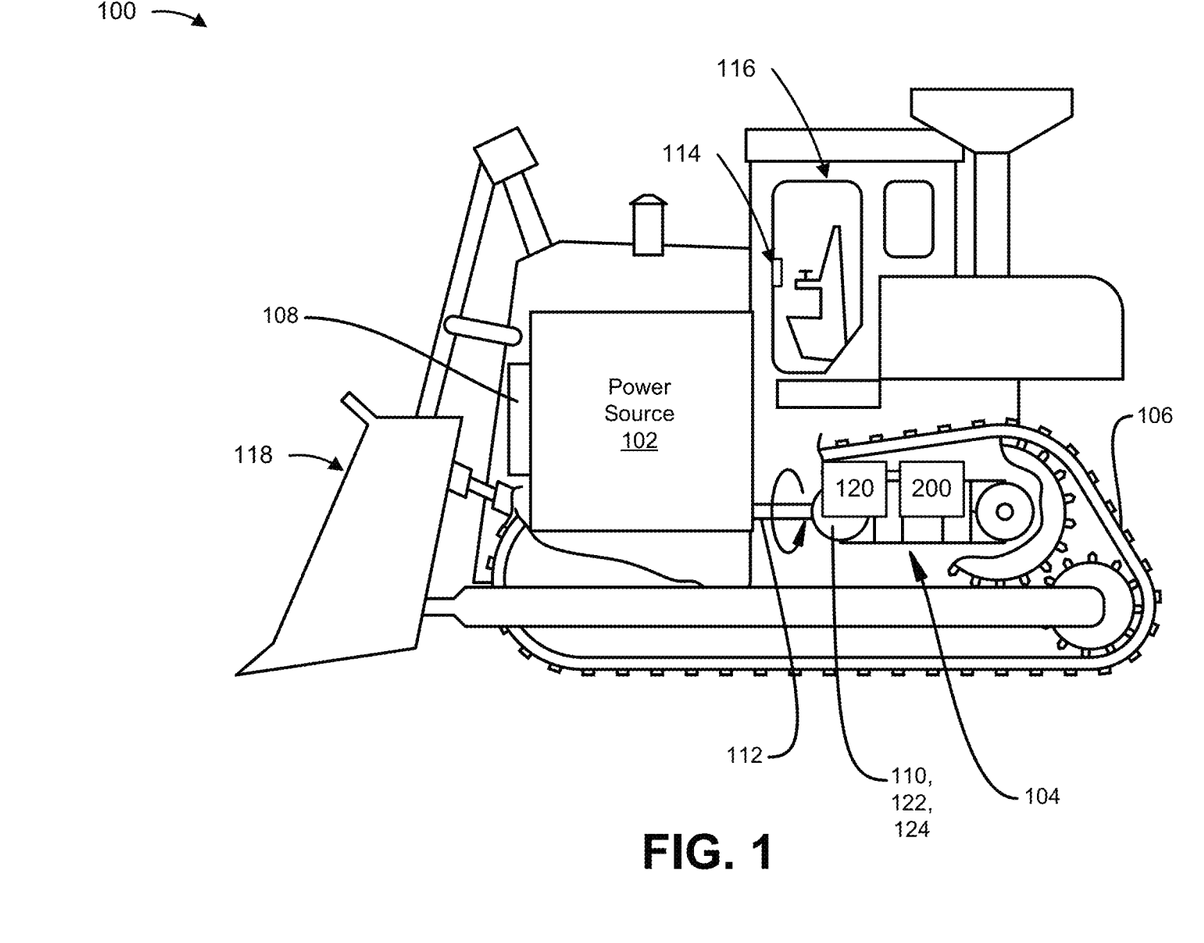
FIG. 1 is a diagram of an example machine that includes a switched reluctance motor control system.

FIG. 1 is a diagram of an example machine 100 that includes a switched reluctance motor control system. The machine 100 is shown as a track type tractor but may include any type of machine that includes switched reluctance motor control system capable of controlling an electric motor (e.g., a switched reluctance motor) of machine 100.

As shown, machine 100 may have a power source 102, an electric drive system 104, a traction system 106, an inverter 108, a motor 110, and a drive shaft 112. The power source 102 is configured to supply power to the machine 100. In some implementations, the power source 102 may be a direct current (DC) power source. The power source 102 may be operably arranged to receive control signals from operator controls 114 in operator station 116. Additionally, the power source 102 may be operably arranged with the electric drive system 104 and/or an implement 118 to selectively operate the electric drive system 104 and/or the implement 118 according to control signals received from the operator controls 114. The power source 102 may provide operating power for the propulsion of the electric drive system 104 and/or the operation of the implement 118 via, for example, the electric drive system 104, the inverter 108, the motor 110, the drive shaft 112, and/or the like.

The electric drive system 104 may be operably arranged with the power source 102 to selectively propel the machine 100 via control signals from the operator controls 114. The electric drive system 104 may be operably connected to a plurality of ground-engaging members, such as traction system 106, as shown, which may be movably connected to the machine 100 through axles, drive shafts, a transmission, and/or other components and which may be movably connected to the electric drive system 104 via the motor 110 and the drive shaft 112. In some implementations, the traction system 106 may be provided in the form of a track-drive system, a wheel-drive system, or any other type of drive system configured to propel the machine 100. In some implementations, the electric drive system 104 may be operably arranged with power source 102 to selectively operate the implement 118, which may be movably connected to the machine 100 and to the electric drive system 104.

The inverter 108 may be electrically connected to the power source 102 and/or the electric drive system 104. In some implementations, the inverter 108 may receive a DC current from the power source 102 and may control a phase of the DC current to provide an AC current to the motor 110, which may be a switched reluctance (SR) motor. Additionally, or alternatively, inverter 108 may provide the AC current to a generator. In this way, the inverter 108 may provide operating power for the propulsion of the machine 100 and/or the operation of the implement 118.

The motor 110 may be electrically coupled to a sensor 120, which may provide feedback to the switched reluctance motor control system 200 to enable control of the inverter 108, the motor 110, and/or the like. For example, the sensor 120 may be a current sensor that provides information identifying a set of currents associated with a set of phases of current provided from the inverter 108 to the motor 110. The motor 110 may include a rotor 122 and a stator 124. Based on the sensor 120 providing feedback to the switched reluctance motor control system 200, the switched reluctance motor control system 200 may determine an estimated angular position (e.g., a relative position) of the rotor 122 and the stator 124 to enable the switched reluctance motor control system 200 to control the inverter 108, the motor 110, and/or the like.

The implement 118 may be operably arranged with the electric drive system 104 such that the implement 118 is selectively movable through control signals transmitted from the operator controls 114 to the electric drive system 104, the inverter 108, the motor 110, the drive shaft 112, and/or the like. The illustrated implement 118 is a tractor loader. Other embodiments can include any other suitable implement for a variety of tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like.

As indicated above, FIG. 1 is provided as an example. Other examples are possible and may differ from what was described in connection with FIG. 1.

Figure 2:
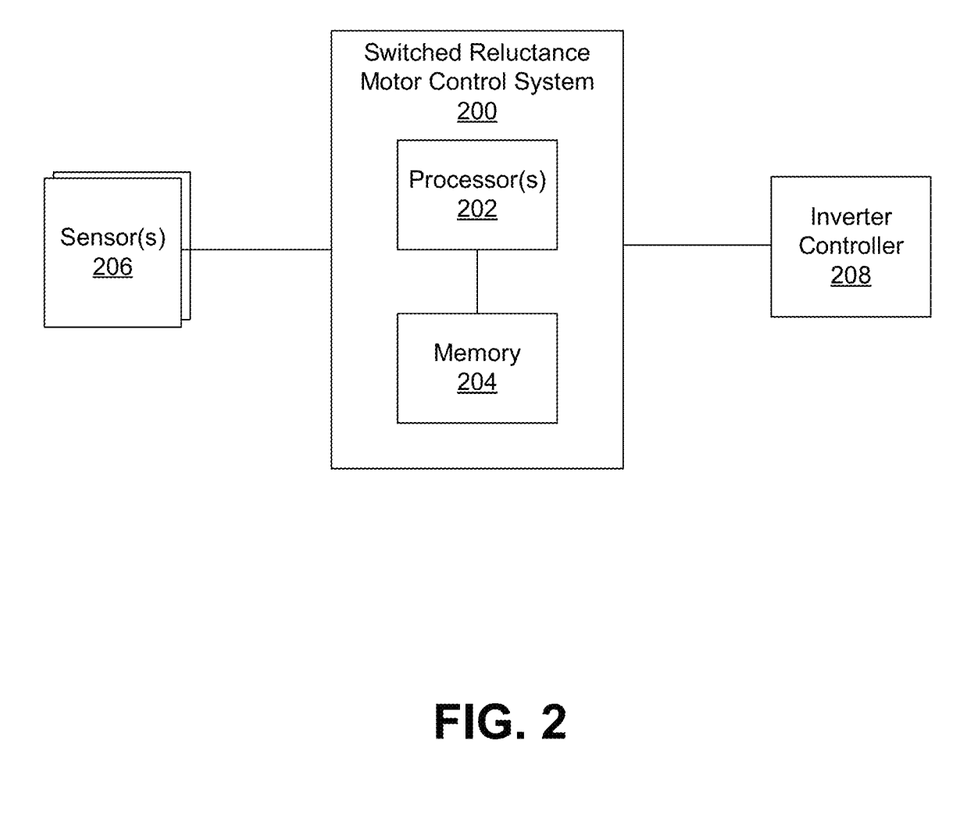
FIG. 2 is a diagram of an example switched reluctance motor control system that may be used with the machine of FIG. 1.

FIG. 2 is a diagram of an example switched reluctance motor control system 200 and associated components that may interact with the switched reluctance motor control system 200.

The switched reluctance motor control system 200 includes one or more processors 202. Processor 202 is implemented in hardware, firmware, or a combination of hardware and software. Processor 202 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 202 includes one or more processors capable of being programmed to perform a function. Memory 204 includes a random access memory (RAM), a read only memory (ROM), and/or another type of dynamic or static storage device (e.g., a flash memory, a magnetic memory, and/or an optical memory) that stores information and/or instructions for use by processor 202.

In some implementations, the switched reluctance motor control system 200 may be an electronic control unit (ECU), an electronic control module (ECM), a controller, and/or the like of the machine 100 and/or the motor 110. The processor 202 may execute one or more instructions and/or commands to control one or more components of machine 100, such as to control operation of the inverter 108, the motor 110, and/or the like. The memory 204 may store program code for execution by the processor 202 and/or for storing data in connection with execution of such program code by the processor 202.

The switched reluctance motor control system 200 may receive one or more input signals from various components of the machine 100, may operate on the one or more input signals to generate one or more outputs signals (e.g., by executing a program using the input signals as input to the program), and may output the one or more output signals to various components of the machine 100. For example, the switched reluctance motor control system 200 may be electronically connected (e.g., via wired or wireless connection) to one or more sensors 206 (e.g., which may correspond to the sensor 120), an inverter controller 208 (e.g., which may be a component of the inverter 108), and/or the like, and may receive input from the sensors 206 and/or the inverter controller 208.

Sensors 206 include a set of sensor devices that provide information regarding a status of the machine 100. For example, sensors 206 may include a current sensor, a flux sensor, a motor speed sensor (e.g., a sensor to determine a speed of the rotor 122), an engine speed sensor (e.g., of an engine coupled to motor 110), a generator speed sensor, and/or the like. For example, a sensor 206 may provide information identifying a first current associated with a first phase, which may be termed a first component current; a second current associated with a second phase, which may be termed a second component current; and a third current associated with a third phase, which may termed a third component current. In this case, the inverter 108 may provide the first component current, the second component current, and the third component current to the motor 110 based on an instruction from the switched reluctance motor control system 200. Based on values of the first component current, the second component current, and the third component current, the switched reluctance motor control system 200 may determine a position estimate (e.g., an estimate of an initial angular position of the motor 110, such as of the rotor 122 relative to the stator 124) without use of a position sensor, may determine a switching command based on the estimate of the initial angular position, and may enable control of the motor 110 using the switching command.

Inverter controller 208 includes a control device (e.g., a current controller, a phase controller, and/or the like) that controls the inverter 108. For example, the inverter controller 208 may receive a switching command from the switched reluctance motor control system 200, and may control a phase of current provided by the inverter 108 to the motor 110 based on the switching command. Additionally, or alternatively, the inverter controller 208 may receive a command relating to providing priming voltage and a current to the motor 110 to enable the determination of the estimate of the initial angular position of the motor 110 without use of a position sensor. In some implementations, the current may be associated with a particular waveform. For example, inverter controller 208 and/or the like may regulate current to obtain a semi-sinusoidal waveform, such as by using hysteresis control with a zero voltage loop when a current value is greater than a target value. In some implementations, each phase of current may be controlled independently in parallel.

Figure 3:
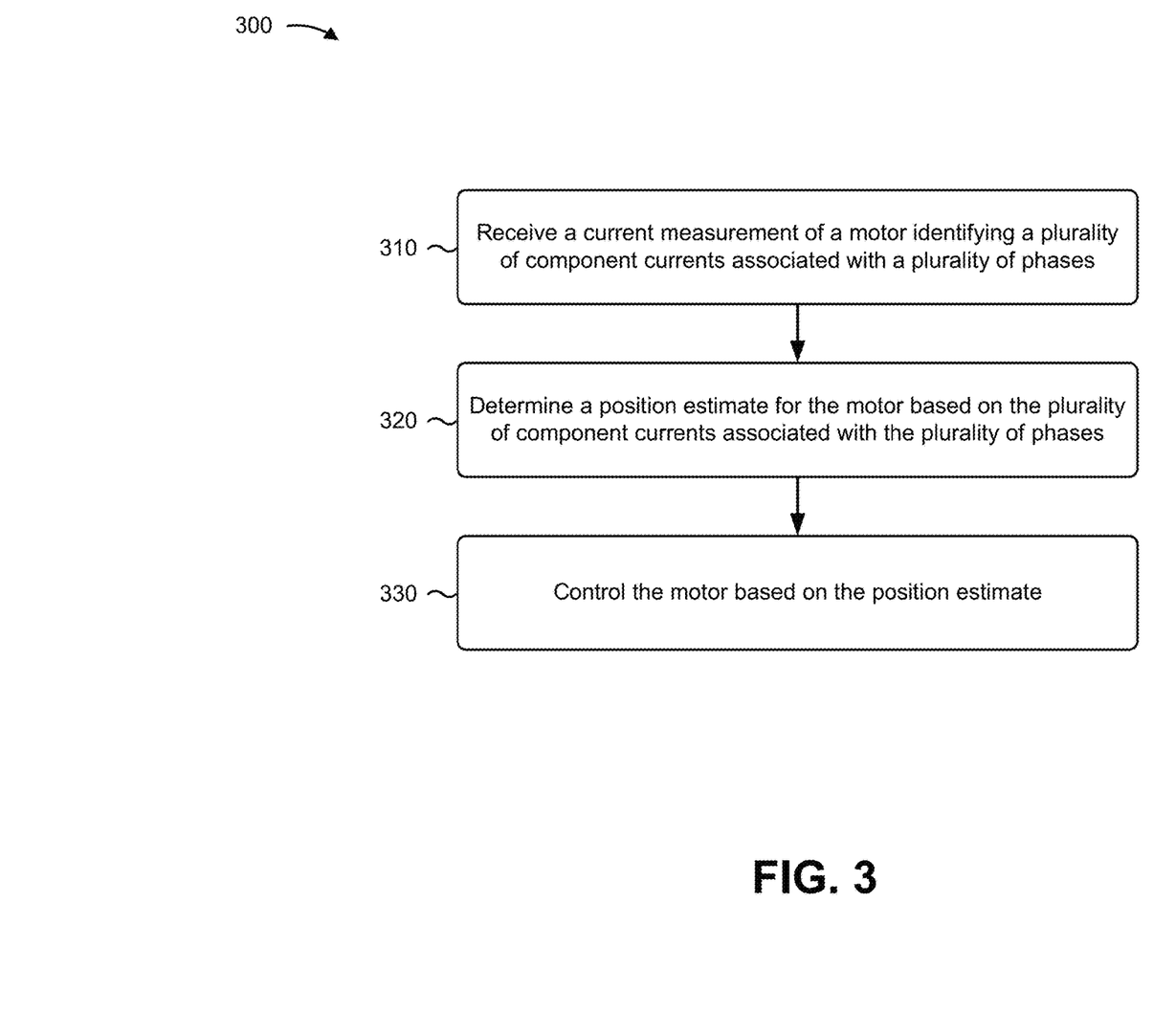
FIG. 3 is a flow chart of an example process for determining a position of a switched reluctance motor without a position sensor.
Figure 4:
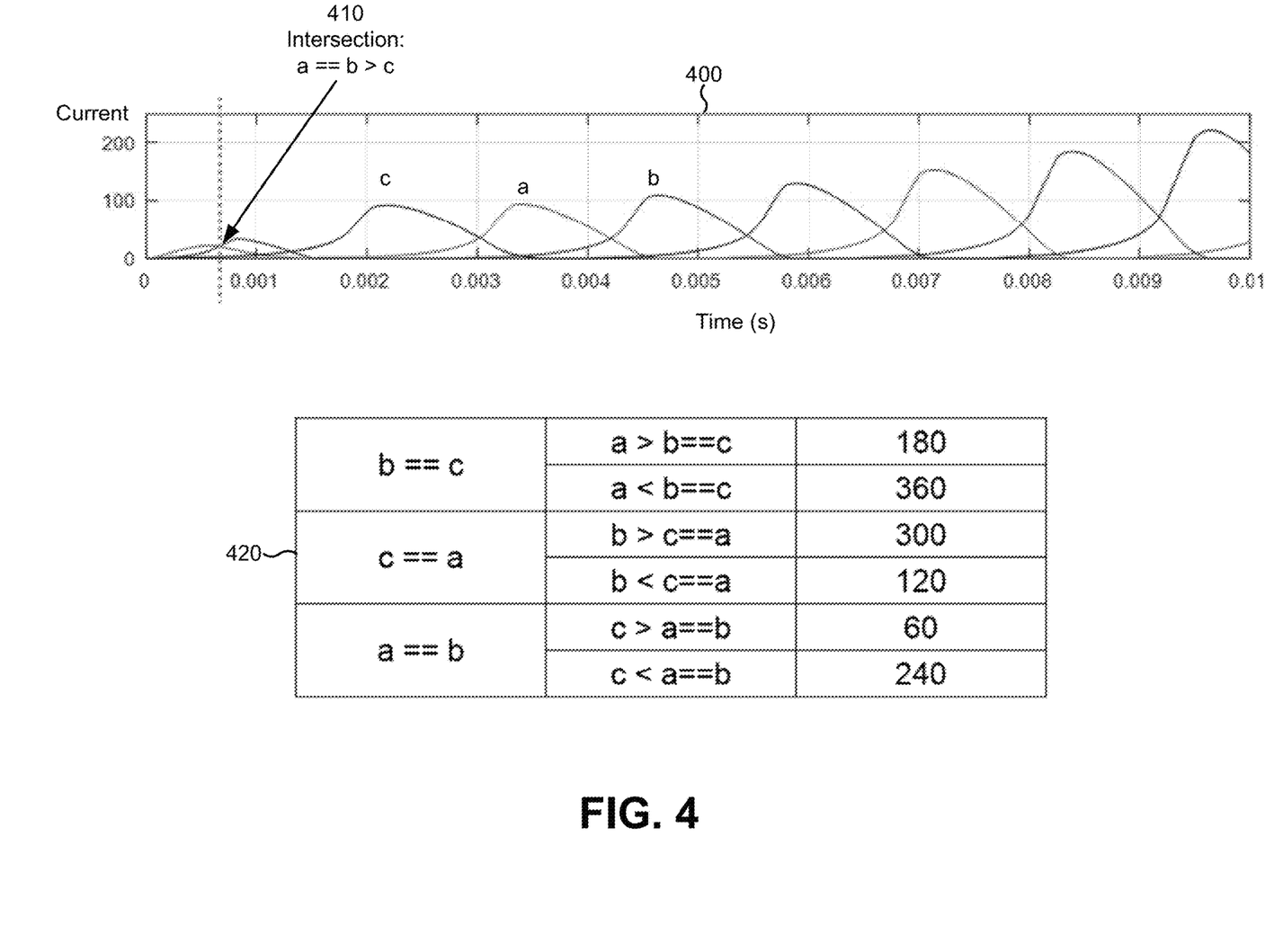
FIG. 4 is a set of diagrams relating to determining a position of a switched reluctance motor without a position sensor.

FIG. 3 is a flow chart of an example process 300 for control of a switched reluctance motor. In some implementations, process 300 may be performed by the switched reluctance motor control system 200. FIG. 4 is a set of diagrams of relating to control of a switched reluctance motor.

As shown in FIG. 3, process 300 may include receiving a current measurement of a motor identifying a plurality of component currents associated with a plurality of phases (block 310). For example, the switched reluctance motor control system 200 (e.g., using processor 202 and/or one or more rules stored in memory 204) may receive the current measurement of the motor (e.g., the motor 110) identifying the plurality of currents associated with the plurality of phases. In some implementations, the switched reluctance motor control system 200 may receive the current measurement based on causing a current to be provided to the motor. For example, the switched reluctance motor control system 200 may cause an inverter (e.g., the inverter 108) to provide, based on a priming voltage, the current on 3 phases concurrently. In this case, the current may be modulated based on back electromotive force (EMF) from a mechanical coupling of the motor to, for example, a drive shaft. In some implementations, the switched reluctance motor control system 200 may receive information identifying a first component current, a second component current, and a third component current corresponding to the 3 phases of the current. In some implementations, the switched reluctance motor control system 200 may receive another measurement, such as an engine speed measurement of an engine coupled to the motor, a rotor speed measurement, a generator speed measurement, and/or the like.

As further shown in FIG. 3, process 300 may include determining a position estimate for the motor based on the plurality of component currents associated with the plurality of phases (block 320). For example, the switched reluctance motor control system 200 (e.g., using processor 202 and/or one or more rules stores in memory 204) may determine the position estimate for the motor (e.g., the motor 110) based on the plurality of component currents associated with the plurality of phases. In some implementations, the switched reluctance motor control system 200 may determine the position estimate (e.g., an estimate of an initial angular position of a rotor relative to a stator of a motor) without receiving a position measurement, a speed measurement, and/or the like.

In some implementations, the switched reluctance motor control system 200 may determine the position estimate based on detecting an equivalence between component currents. For example, the switched reluctance motor control system 200 may determine that a first component current is equal to a second component current, and may determine the position estimate based on relative values for the first component current, the second component current, and the third component current when the first component current is equal to the second component current (e.g., based on whether the third component current is larger than or smaller than the first component current and the second component current).

As shown in FIG. 4, and by diagram 400, the switched reluctance motor control system 200 may track values for the first component current (a) the second component current (b), and the third component current (c) over time. As shown by reference number 410, the switched reluctance motor control system 200 may, at a particular time (e.g., t<0.001 seconds (s)), detect an equivalence between component currents (e.g., a==b).

In some implementations, the switched reluctance motor control system 200 may determine the equivalence based on determining a sign change of a difference between a set of component currents of the plurality of component currents. For example, for a first component current, a, a second component current, b, and a third component current, c, the switched reluctance motor control system 200 may determine that a value for a–b has changed from positive to negative or from negative to positive, indicating that a was equal to b (e.g., at a time at which the plurality of component currents was measured, at a time between measurements of the plurality of component currents, and/or the like). In this case, the estimated position may be at a defined angle, and the defined angle may be determined based on which two component currents were equal and a value for a third component current relative to the two component currents that were equal.

As shown in FIG. 4, and by diagram 420, the switched reluctance motor control system 200 may determine that, based on determining that a is equal to b and that a and b are greater than c, that a relative position is 240 degrees. Further, as shown in diagram 420, when a is equal to b and c is greater than a and b, the relative position may be 60 degrees; when a is equal to c and b is greater than a and c, the relative position may be 300 degrees; when a is equal to c and b is less than a and c, the relative position may be 120 degrees; when b is equal to c and a is greater than b and c, the relative position may be 180 degrees; and when b is equal to c and a is less than b and c, the relative position may be 360 degrees. Although described herein in terms of a particular quantity and set of component currents and a particular set of relative positions, other quantities and/or sets of component currents and sets of relative positions may be possible. In some implementations, the switched reluctance motor control system 200 may determine the relative position based on stored information, such as based on a table lookup.

In some implementations, based on the position estimate, a time measurement (e.g., of a time that elapsed from applying the plurality of currents to detecting a sign change identifying a component current equivalency), and/or a speed measurement, the switched reluctance motor control system 200 may determine an initial position of the rotor relative to the stator, thereby enabling determination of switching commands to control the motor. In some implementations, the time measurement may be less than a threshold. For example, the switched reluctance motor control system 200 may detect a component current equivalency (e.g., and determine the estimated angular position) within 0.01 seconds, within 0.005 seconds, within 0.002 seconds, within 0.001 seconds, within 20 microseconds, and/or the like of applying the plurality of component currents.

As further shown in FIG. 3, process 300 may include controlling the motor based on the position estimate (block 330). For example, the switched reluctance motor control system 200 (e.g., using processor 202 and/or one or more rules stored in memory 204) may control the motor based on the position estimate. In this case, the switched reluctance motor control system 200 may transmit a command to control operation of the inverter 108, the motor 110, and/or the like to enable operation of the motor 110 to, for example, move the machine 100, the implement 118, and/or the like.

Process 300 may include additional implementations, such as any single implementation or any combination of implementations described below and/or in connection with one or more other processes described elsewhere herein.

In some implementations, process 300 includes determining the angular position estimate without receiving information identifying a position measurement or a speed measurement. In some implementations, the switched reluctance motor is included in a machine. In some implementations, process 300 includes causing an inverter of the switched reluctance motor to provide the current, wherein the current is associated with a priming voltage of the inverter. In some implementations, the angular position estimate is an initial position estimate for a rotor of the switched reluctance motor. In some implementations, an amount of time between an initial state of the switched reluctance motor at which the current is provided and a determination of the angular position estimate for the switched reluctance motor is less than 0.01 seconds.

In some implementations, an amount of time between an initial state of the switched reluctance motor at which the current is provided and a determination of the angular position estimate for the switched reluctance motor is less than 0.005 seconds. In some implementations, an amount of time between an initial state of the switched reluctance motor at which the current is provided and a determination of the angular position estimate for the switched reluctance motor is less than 0.001 seconds. In some implementations, process 300 includes determining the angular position estimate based on an amount of time between an initial state of the switched reluctance motor at which current is provided and a determination of the angular position estimate. In some implementations, process 300 includes determining the angular position estimate based on a speed of the switched reluctance motor.

In some implementations, the plurality of component currents includes three currents. In some implementations, process 300 includes determining a sign change of a difference between a first current, of the plurality of component currents, and a second current of the plurality of component currents. In some implementations, process 300 includes determining that a first current value is greater than a second current value, wherein the first current value is associated with a first current of the plurality of component currents, and wherein the second current value is associated with a second current, of the plurality of component currents, and with a third current of the plurality of component currents; and determining the position estimate based on determining that the first current value is greater the second current value. In some implementations, process 300 includes determining the position estimate based on an engine speed of an engine coupled to the motor. In some implementations, the plurality of phases is associated with a pulse width modulation scheme.

In some implementations, the motor is a switched reluctance motor. In some implementations, the initial position estimate is an angular position estimate. In some implementations, the angular position estimate is 60 degrees, 120 degrees, 180 degrees, 240 degrees, 300 degrees, or 360 degrees.

In some implementations, process 300 may include causing a current to be provided to a switched reluctance motor; determining a plurality of component currents associated with a plurality of phases based on a result of causing the current to be provided to the switched reluctance motor; determining that a first component current, of the plurality of component currents, is equal to a second component current of the plurality of component currents; determining, based on whether a third component current, of the plurality of component currents, is greater than or less than the first component current and the second component current, an angular position estimate for the switched reluctance motor; and controlling, based on the angular position estimate, the switched reluctance motor.

In some implementations, a motor including a stator and a rotor, an inverter coupled to the motor, and a controller, and the controller may be configured to cause the inverter to provide a current associated with a priming voltage to the motor, wherein the current is associated with a plurality of phases to the motor, wherein the current is modulated based on back electromotive force (EMF) associated with the motor; determine, based on causing the inverter to provide the current, a plurality of current components corresponding to the plurality of phases; determine, based on the plurality of current components, an initial position estimate for the stator or the rotor; and control the inverter and the motor using at least one command signal based on the initial position estimate.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel. As indicated above, FIG. 4 is provided as an example. Other examples are possible and may differ from what was described in connection with FIG. 4.

INDUSTRIAL APPLICABILITY

The switched reluctance motor control system 200 may be used with any machine 100 that uses a motor 110 and an inverter 108. During initial operation of the machine 100, the switched reluctance motor control system 200 determines an initial position estimate (e.g., of a relative angular position of a rotor of motor 110 relative to a stator of motor 110), and uses the initial position estimate to determine switching commands for switching phases of the inverter 108 to enable operation of the motor 110. In this way, the switched reluctance motor control system 200 enables the initial position estimate without requiring the motor 110 to include a position sensor, where such a position sensor may add cost, complexity, size, and/or the like to the machine 100, and may reduce serviceability, increase a likelihood of failure, and/or the like of the machine 100. Moreover, the switched reluctance motor control system 200 may improve, relative to other techniques, efficiency, torque accuracy, torque ripple, stability, thermal management, robustness, and/or the like across a range of torque conditions, speed conditions, temperature conditions, operating states (e.g., a stall sate, a zero speed state, a dynamic transient state, a directional shift state), and/or the like.

Thus, determining an initial position estimate for the motor 110 of the machine 100, using the switched reluctance motor control system 200 and without a position sensor, may improve operation of the machine 100 and/or the motor 110.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A switched reluctance motor control system, comprising:
   a memory; and
   one or more processors configured to:
   cause a current to be provided to a switched reluctance motor based on an application of a priming voltage to the switched reluctance motor;
   determine a plurality of component currents associated with a plurality of motor phases based on the current provided to the switched reluctance motor;
   determine that a first component current, of the plurality of component currents, is equal to a second component current of the plurality of component currents;
   determine an initial position of a rotor of the switched reluctance motor based on whether a third component, of the plurality of component currents, is greater than or less than the first component current and the second component current and based on a time measurement of a time between causing the current to be provided to the switched reluctance motor and determining that the first component current is equal to the second component current; and
   control the switched reluctance motor based on the initial position of the rotor of the switched reluctance motor.

2. The switched reluctance motor control system of claim 1, wherein the one or more processors are configured to determine the initial position without receiving information identifying a position measurement or a speed measurement.

3. The switched reluctance motor control system of claim 1, wherein the switched reluctance motor is included in a machine.

4. The switched reluctance motor control system of claim 1, wherein the one or more processors when causing the current to provided, are configured to:
   cause an inverter of the switched reluctance motor to provide the current.

5. The switched reluctance motor control system of claim 1, wherein the time measurement is less than 0.01 seconds.

6. The switched reluctance motor control system of claim 1, wherein the time measurement is less than 0.005 seconds.

7. The switched reluctance motor control system of claim 1, wherein the time measurement is less than 0.001 seconds.

8. The switched reluctance motor control system of claim 1, wherein the initial position is determined further based on a speed of the switched reluctance motor.

9. A method for controlling a switched reluctance motor, comprising:
   receiving, by a device, a current measurement of the switched reluctance motor identifying a plurality of component currents associated with a plurality of motor phases;
   determining, by the device, that a first component current, of the plurality of component currents, is equal to a second component current of the plurality of component currents;
   determining, by the device, an initial position associated with the switched reluctance motor based on whether a third component, of the plurality of component currents, is greater than or less than the first component current and the second component current and based on a time measurement of a time between a current being provided to the switched reluctance motor and determining that the first component current is equal to the second component current; and controlling the switched reluctance motor based on the initial position associated with switched reluctance motor.

10. The method of claim 9, wherein determining that the first component current is equal to the second component current comprises:
determining a sign change of a difference between the first component current and the second component current; and
determining that the first component current is equal to the second component current based on determining the sign change of the difference between the first component current and the second component current.

11. The method of claim 9, wherein the initial position associated with the switched reluctance motor is determined further based on an engine speed of an engine coupled to the switched reluctance motor.

12. The method of claim 9, wherein the plurality of motor phases is associated with a pulse width modulation scheme.

13. A machine, comprising:
a motor including a stator and a rotor;
an inverter coupled to the motor; and
a controller configured to:
cause the inverter to provide a current associated with a plurality of phases to the motor and associated with providing a priming voltage to the motor,
wherein the current is modulated based on back electromotive force (EMF) associated with the motor;
determine, based on causing the inverter to provide the current, a plurality of component currents corresponding to the plurality of phases,
wherein the plurality of component currents include a first component current a second component current, and a third component current;
determine whether the first component current is greater than or less than one or more of the second component current or the third component current;
determine an initial position estimate associated with the motor based on whether the first component current is greater than or less than one or more of the second component current or the third component current and based on a time measurement of a time between the current being provided by the inverter and a determination of an equivalency associated with one or more of the first component current, the second component current, or the third component current; and
control the inverter and the motor using at least one command signal based on the initial position estimate.

14. The machine of claim 13, wherein the motor is a switched reluctance motor.

15. The machine of claim 13, wherein the initial position estimate is an angular position estimate.

16. The machine of claim 15, wherein the angular position estimate is 60 degrees, 120 degrees, 180 degrees, 240 degrees, 300 degrees, or 360 degrees.

17. The machine of claim 13,
wherein the controller is further configured to:
determine that the second component current is equal to the third component current, and
wherein, when determining whether the first component current is greater than or less than one or more of the second component current or the third component current, the controller is configured to:
determine whether the first component current is greater than or less than the second component current and the third component current.

18. The machine of claim 17, wherein, when determining that the second component current is equal to the third component current, the controller is configured to:
determine a sign change of a difference between the second component current and the third component current; and
determine that the second component current is equal to the third component current based on determining the sign change of the difference between the second component current and the third component current.

19. The machine of claim 13, wherein the initial position estimate is determined further based on an engine speed of an engine coupled to the motor.

20. The machine of claim 13, wherein the initial position estimate is determined further based on a speed of the motor.

* * * * *